(12) United States Patent
Yuh et al.

(10) Patent No.: US 7,201,985 B2
(45) Date of Patent: Apr. 10, 2007

(54) INACTIVE END CELL ASSEMBLY FOR FUEL CELLS FOR IMPROVED ELECTROLYTE MANAGEMENT AND ELECTRICAL CONTACT

(75) Inventors: Chao-Yi Yuh, New Milford, CT (US); Mohammad Farooque, Danbury, CT (US); Richard Johnsen, New Fairfield, CT (US)

(73) Assignee: FuelCell Energy, Inc., Danbury, CT (US)

( * ) Notice: Subject to any disclaimer, the term of this patent is extended or adjusted under 35 U.S.C. 154(b) by 449 days.

(21) Appl. No.: 10/407,544

(22) Filed: Apr. 3, 2003

(65) Prior Publication Data

US 2004/0121213 A1 Jun. 24, 2004

Related U.S. Application Data

(63) Continuation-in-part of application No. 10/329,305, filed on Dec. 24, 2002, now abandoned.

(51) Int. Cl.
*H01M 2/02* (2006.01)
(52) U.S. Cl. .............................. 429/34; 429/38; 429/40
(58) Field of Classification Search .................. 429/34, 429/35, 37, 40, 32, 38, 16
See application file for complete search history.

(56) References Cited

U.S. PATENT DOCUMENTS

| | | | |
|---|---|---|---|
| 4,548,877 A | 10/1985 | Iacovangelo et al. | |
| 4,591,538 A | 5/1986 | Kunz | |
| 4,604,331 A | 8/1986 | Louis | |
| 4,609,595 A | 9/1986 | Nickols | |
| 4,643,954 A | 2/1987 | Smith | |
| 4,689,280 A | 8/1987 | Gionfriddo | |
| 4,704,340 A | 11/1987 | Kunz | |
| 4,761,348 A | 8/1988 | Kunz et al. | |
| 4,980,248 A | 12/1990 | Fujita | |
| 5,009,968 A | 4/1991 | Guthrie et al. | |
| 5,019,464 A | 5/1991 | Mitsuda et al. | |
| 5,110,692 A | 5/1992 | Farooque et al. | |
| 6,844,102 B2 * | 1/2005 | Allen et al. | 429/46 |
| 6,890,679 B2 | 5/2005 | Johnsen et al. | |
| 2003/0186103 A1 | 10/2003 | Hoffmann | |

FOREIGN PATENT DOCUMENTS

| | | |
|---|---|---|
| DE | 195 45 659 A1 | 3/1997 |
| DE | 38 08 991 A1 | 10/1998 |
| WO | WO 01/93359 A1 | 12/2001 |

* cited by examiner

*Primary Examiner*—Raymond Alejandro
(74) *Attorney, Agent, or Firm*—Cowan, Liebowitz & Latman, P.C.

(57) ABSTRACT

An assembly for storing electrolyte in a carbonate fuel cell is provided. The combination of a soft, compliant and resilient cathode current collector and an inactive anode part including a foam anode in each assembly mitigates electrical contact loss during operation of the fuel cell stack. In addition, an electrode reservoir in the positive end assembly and an electrode sink in the negative end assembly are provided, by which ribbed and flat cathode members inhibit electrolyte migration in the fuel cell stack.

12 Claims, 5 Drawing Sheets

Positive End Cell 10

Positive End Cell 10

Negative End Cell 20

INACTIVE END CELL ASSEMBLY FOR FUEL CELLS FOR IMPROVED ELECTROLYTE MANAGEMENT AND ELECTRICAL CONTACT

CROSS REFERENCE TO RELATED APPLICATIONS

This application is a continuation-in-part of U.S. patent application Ser. No. 10/329,305, filed Dec. 24, 2002, now abandoned.

STATEMENT AS TO RIGHTS TO INVENTIONS MADE UNDER FEDERALLY SPONSORED RESEARCH AND DEVELOPMENT

This invention was made with Government support under contract DE-FC21-95MC31184 awarded by the Department of Energy. The Government has certain rights in the invention.

BACKGROUND OF THE INVENTION

This invention relates to a liquid electrolyte fuel cell such as a molten carbonate fuel cell and, in particular, to an end cell assembly for use at the positive and negative ends of a stack of such fuel cells.

As shown in FIG. 1, a fuel cell generally comprises an anode and cathode separated by an electrolyte. An anode current collector is provided adjacent to the anode, opposite the electrolyte, through which fuel is allowed to pass. Similarly, a cathode current collector allowing passage of oxygen is provided adjacent to the cathode and opposite the electrolyte.

Fuel cells of this type using carbonate as the electrolyte are well-known and have been described in numerous publications and patents. In a molten carbonate fuel cell, the carbonate electrolyte comprises an alkali metal carbonate material, such as lithium or potassium carbonate, in a particulate matrix of inert ceramic material, such as lithium aluminate. At the operating temperature of the molten carbonate fuel cell, which is approximately 650° C. (1200° F.), the carbonate electrolyte is an ionically conductive molten liquid.

With fuel introduced at the anode electrode and oxidant introduced at the cathode electrode, the fuel is oxidized in an electrochemical reaction at the interface between the electrodes and the electrolyte. This releases a flow of electrons between the anode and cathode, thereby converting chemical energy into electrical energy. The anode and cathode electrodes are each preferably made of a porous metal such as porous nickel powder or nickel oxide that is sufficiently active at cell operating temperatures to serve as catalysts for the anode and cathode reactions, respectively.

A single fuel cell as shown in FIG. 1 produces relatively low voltage. In order to generate higher voltages, individual cells are arranged in series as a fuel cell stack. As shown in FIG. 1, a separator plate, preferably made of stainless steel, is provided to separate each fuel cell from adjacent cells in the stack. As used herein, the term "end cell" is defined as either of the fuel cells at the positive or cathode and negative or anode ends of the stack, each of which provides structural termination.

A significant problem associated with the fuel cell stack configuration is loss of electrolyte preferentially from the cells closest to the positive end of the stack and gain of electrolyte mostly by the cells closest to the negative end of the stack. Mainly, two processes cause the electrolyte loss from the positive end in excess of the central cells. The first process is liquid electrolyte creepage onto the structurally terminating end plate, which is adjacent to the end cell. The second process, migration of electrolyte, causes electrolyte to flow in films along the surfaces of the stack toward the negative or anode end. As a result, fuel cells at the positive end of the stack lose more electrolyte compared to the central cells and cells at the negative end gain electrolyte. The effects of electrolyte migration are the most severe in the end cells, which are positioned closest to the positive and negative ends of the stack. Depletion of electrolyte from the positive end cell by creepage and migration leaves gas pockets in the electrolyte matrix. This results in an irreversible increase in internal electrical resistance of the end cells, significant voltage drop, and deterioration of long-term end cell performance. Also, electrolyte migration towards the negative end may cause flooding of the negative end cell and loss of performance and long-term stability.

Accordingly, it has been recognized that inhibiting electrolyte migration and the associated increase in electrical resistance of the end cells can enhance the durability of a carbonate fuel cell. Various structures have been proposed to slow or inhibit electrolyte migration. Specifically, efforts have been made in this regard to provide a "half-cell" anode, which refers to an anode section of a fuel cell including an anode reaction gas flow path, an anode electrode and a gas sealing structure adjacent to the end cathode, and a "half-cell" cathode (with a structure similar to the "half-cell" anode) adjacent to the end anode in a fuel cell stack (U.S. Pat. No. 5,019,464 to Mitsuda et al.). The "half-cell" anode in this design stores additional electrolyte that replenishes the electrolyte lost from the cell closest to the positive end of the stack by migration and other mechanisms. The "half-cell" cathode placed adjacent to the negative end regular cell anode absorbs the extra electrolyte that moves to the negative end of the stack. This arrangement prevents flooding of the cell closest to the negative end of the stack and delays depletion of electrolyte from the end cell at the cathode end, but electrolyte migration is not eliminated and the "half-cell" anode must be periodically replenished with electrolyte. Furthermore, the "half-cell" anode placed at the positive end of the stack has limited electrolyte storage capacity. The anode is made of Ni which is non-wetting to the electrolyte, or not conducive to the electrolyte flowing across it, and the anode porosity is also low, i.e., less than 55%, because of structural strength considerations.

Other efforts have been made to substantially block creepage of molten carbonate electrolyte, such as by providing an electrolyte creepage barrier comprising a thin layer of material which is poorly wet by the liquid electrolyte, for example, gold foil, sandwiched between ceramic layers at the negative or anode end of the stack (U.S. Pat. No. 4,704,340 to Kunz); and forming either of the anode or cathode electrodes with ceramic particles having pore size such that capillary forces urge electrolyte into discrete portions of the electrode for storage (U.S. Pat. No. 4,548,877 to Iacovangelo et al.). U.S. Pat. No. 5,110,692 teaches a technique to retard electrolyte movement from the positive end to the negative end by incorporating ceramic electrolyte flow barriers within the gasket body.

Additional efforts have been made in this regard to mitigate against electrolyte migration and consumption by replenishing consumed electrolyte and maintaining the electrolyte at a consistent composition. Particularly, U.S. Pat. No. 4,980,248 to Fujita teaches a molten carbonate fuel cell in which a lithium-containing composite oxide reacts with oxidizing gas flow such that the electrolyte which has been consumed is replenished and maintained at a consistent composition. In addition, U.S. Pat. No. 4,591,538 to Kunz teaches a binary electrolyte with uniform lithium to potassium molar ratio during operation along the length of the fuel cell stack.

A second problem associated with end cells in a fuel cell stack is the increase in end cell electrical resistance due to shrinkage or deformity of cell components at stack operating temperatures. Common molten carbonate stack designs include rigid, thick end plates to which is directly applied an appropriate compressive loading force for adequate sealing and good electrical and thermal conductivity between adjacent cells and components within the stack. At normal stack operating temperatures, and particularly during startup and shutdown of a fuel cell stack, temperature gradients form between the opposite surfaces of the end plates and may cause the end plates to deform. Additional mechanical mismatch may occur during operation of the stack, particularly in the cathode or positive side end cell, due to cathode shrinkage. Carbonate fuel cell cathode shrinkage is known to occur slowly with operation.

The cathode "half-cell" is usually constructed from a corrugated current collector with a cathode attached to it. The corrugated current collector extends over the entire cell area. However, the cathode extends over less than the entire area, since it does not extend to the wet seal edges. Therefore, the wet seal thickness must be matched to the cathode thickness to maintain the flatness of the cell structure. In the prior art, a flat shim made of sheet metal is inserted under the flap of the wet seal to account for the difference in thickness of the active area and the wet seal. As the cathode shrinks, the cell compressive pressure shifts from the active part of the cell to the wet seal area. This lowering of compressive force in the active area causes loss of electrical contact at various locations within the end cell and results in non-uniform application of the compressive force across the fuel cell. Once electrical contact loss occurs, recovery of the original electrical conductivity at the interface is unlikely, even if the original distribution of compressive forces returns.

Some efforts have been made to reduce electrical contact loss in the end cell. Specifically, it has been proposed to use an electrically conductive flexible thin end plate membrane in combination with semi-rigid insulation layers at the positive and negative ends of the fuel cell stack in order to maintain a substantially uniform compressive loading pressure across the plane of fuel cells during normal operation despite thermal distortion (U.S. Pat. No. 5,009,968 to Guthrie et al.). Electrical contact is thereby maintained in the end cell between the flexible conductive end membrane and the electrodes. However, electrolyte migration and the associated increase in resistance are not inhibited by the end cell structure of this patent.

It is therefore an object of the present invention to provide an end cell for storing electrolyte in a molten carbonate fuel cell that does not suffer from the above disadvantages.

It is a further object of the present invention to provide an end cell for use at the positive and negative ends of a molten carbonate fuel cell stack, the end cell at the positive end having a ribbed electrode reservoir that maximizes electrolyte storage capacity and the end cell at the negative end having a ribbed electrode sink that maximizes sink capacity.

It is further objective of this invention to provide a soft, compliant and resilient, highly electrically conductive separating surface between the end plate and the electrolyte reservoir at the positive end of the stack, and between the end plate and the electrolyte sink at the negative end of the stack, to alleviate the resistance increase caused by distortion and inadequate contact between the hard end plate and the cell packages in contact with it, eliminating contact loss in the end cell.

It is a further objective of this invention to provide a soft, compliant and resilient wet seal in the cathode side of the inactive end cell to ensure that when the inactive cathode shrinks during operation of the fuel cell, the cell compressive force is distributed to the cell active area and is not disproportionately transferred to the wet seal area.

It is still a further object of the present invention to provide an improved end cell for electrolyte storage that eliminates the above-mentioned problems associated with electrolyte migration and that enhances and extends long-term end cell performance.

SUMMARY OF THE INVENTION

The above and other objects are realized in an assembly for storing electrolyte in a molten carbonate fuel cell stack, including an active electrode part, an electrode reservoir or sink, an inactive anode part, and an end plate. As used herein, "reservoir" refers to a structure capable of holding or storing electrolyte and distributing electrolyte, if necessary, where needed. "Sink" and "sponge" are used to refer to a structure capable of collecting, absorbing and holding excess electrolyte. Each of the active electrode parts comprises at least an electrode and a current collector. The reservoir as well as the sink comprises a ribbed cathode to maximize electrolyte storage capacity. Each of the inactive anode parts comprises at least a foam anode layer and an anode current collector. The end cell for the negative side of the stack includes an inactive anode part next to it. The end cell for the positive or cathode side of the stack preferably includes an inactive anode part adjacent to both sides of the ribbed electrode reservoir.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
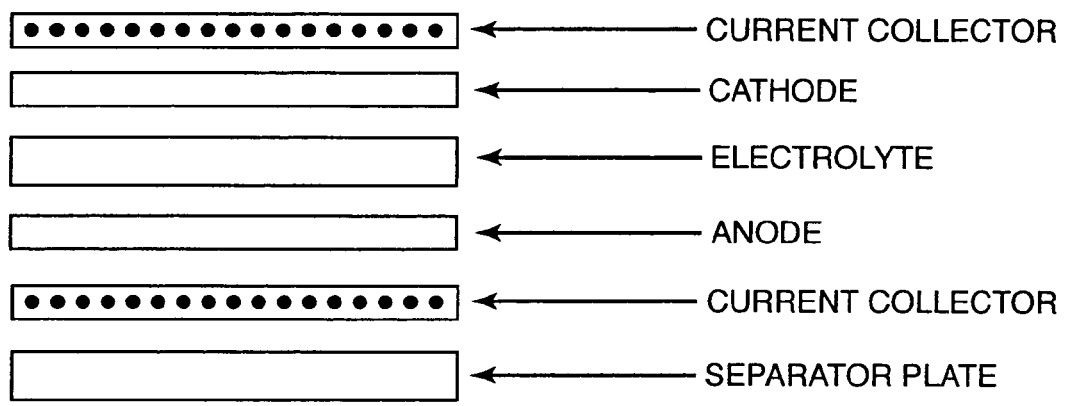
FIG. 1 is a schematic representation of the components of a conventional carbonate fuel cell assembly.
Figure 2:
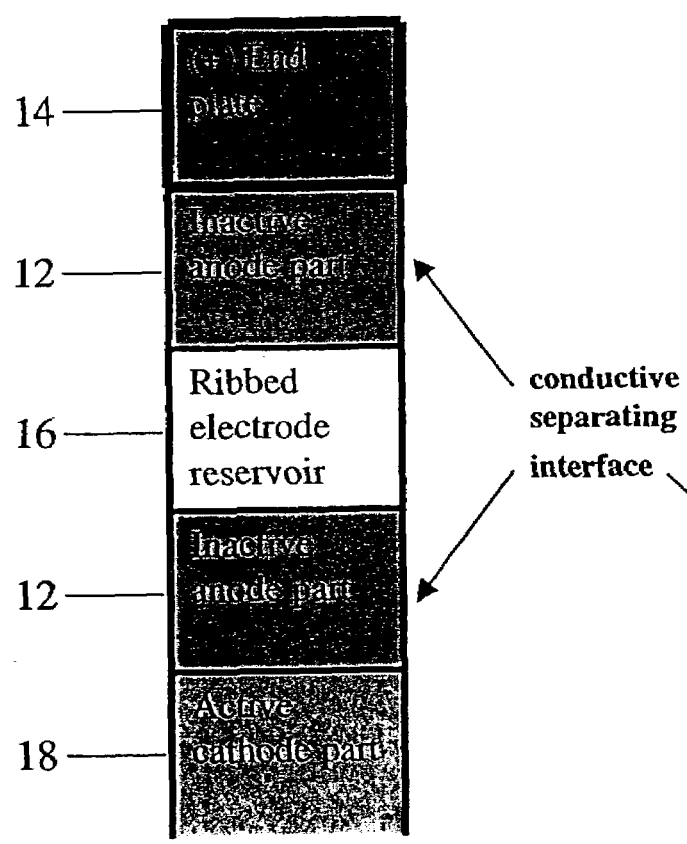
FIG. 2 is a block diagrammatic representation of the end cell assembly at the positive and negative ends of a molten carbonate fuel cell stack in accordance with the principles of the present invention.
Figure 2:
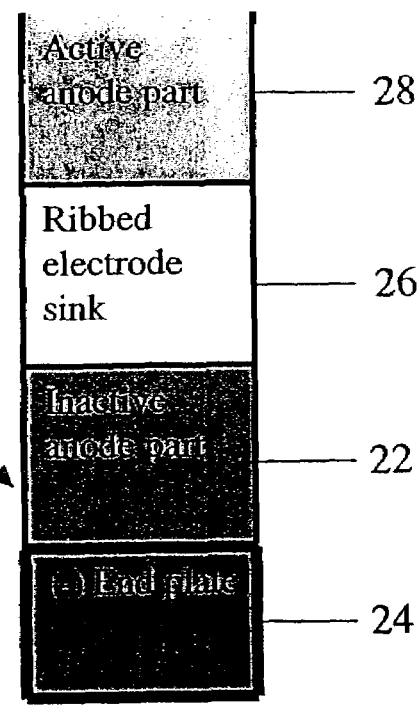

FIG. 2 generally illustrates the end cell assembly at both the positive and negative ends of a fuel cell stack in accordance with the principles of the present invention. As shown, an inactive anode part 12, 22 is disposed adjacent to the end plate 14, 24 at both ends of the stack. On the positive, or cathode, side of the fuel cell stack, the end cell 10 further includes a ribbed electrode reservoir 16 separated from an active cathode part 18 by a second inactive anode part 12. The end cell assembly 20 on the negative, or anode, side of the stack includes a ribbed electrode sink 26 adjacent to an active anode part 28. In the end cell structure at both ends of the stack, the inactive anode parts 12, 22 provide an electrically conductive separating interface between the ribbed electrode reservoir 16 or sink 26 and the end plates 14, 24 and, in the positive end cell 10, between the active cathode part 18 and the ribbed electrode reservoir 16.

Figure 3:
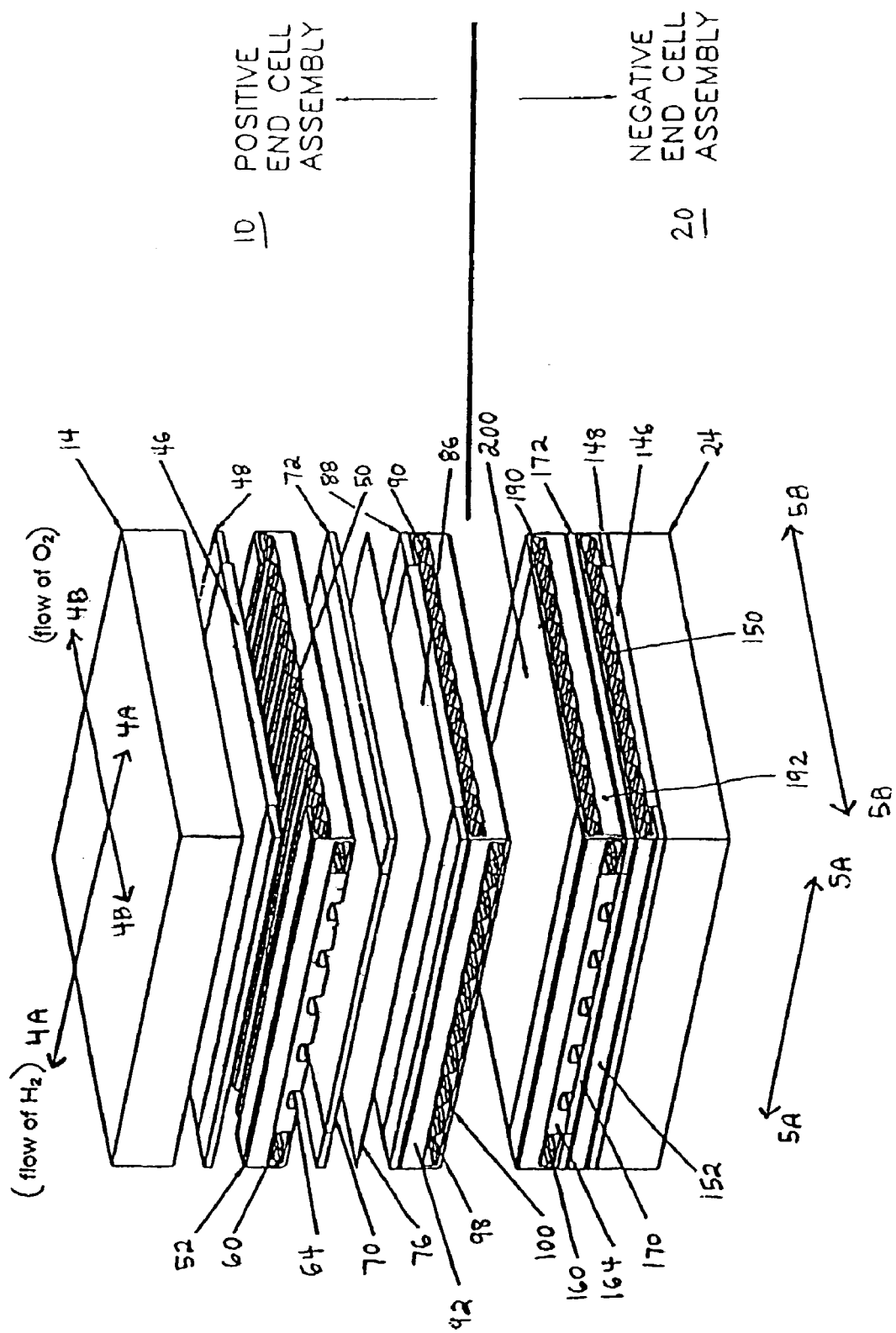
FIG. 3 is an exploded perspective view of the end cells on both the positive and negative ends of a fuel cell stack in accordance with the principles of the present invention.

FIG. 3 is an exploded perspective view showing the structure of each layer of the end cell on both ends of a molten carbonate fuel cell stack in accordance with the present invention. First, the structure of the positive, or cathode end cell in the fuel cell stack will be described with reference to the upper portion of FIG. 3 and FIGS. 4A and 4B.

Positive End Cell Assembly

Figure 4A:
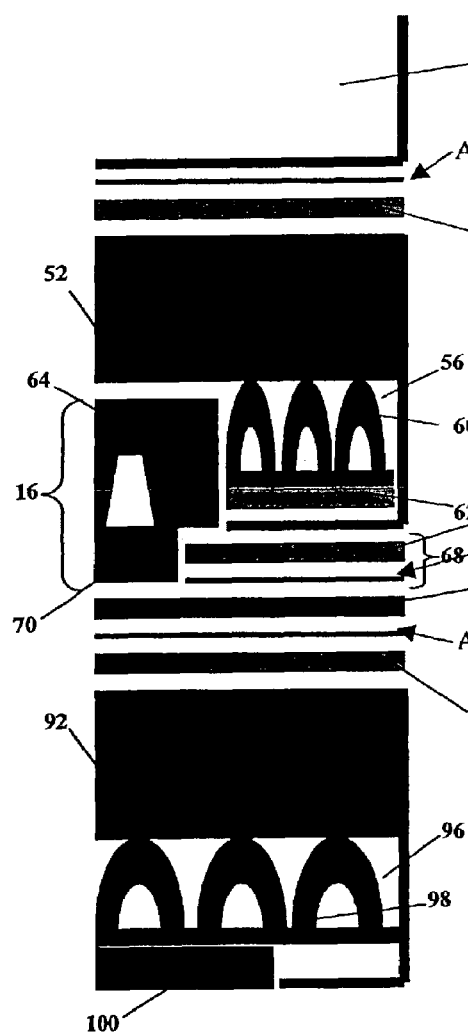
FIG. 4A is a cross-sectional view of the end cell at the positive end of a fuel cell stack along line 4A—4A of FIG. 3.
Figure 4B:
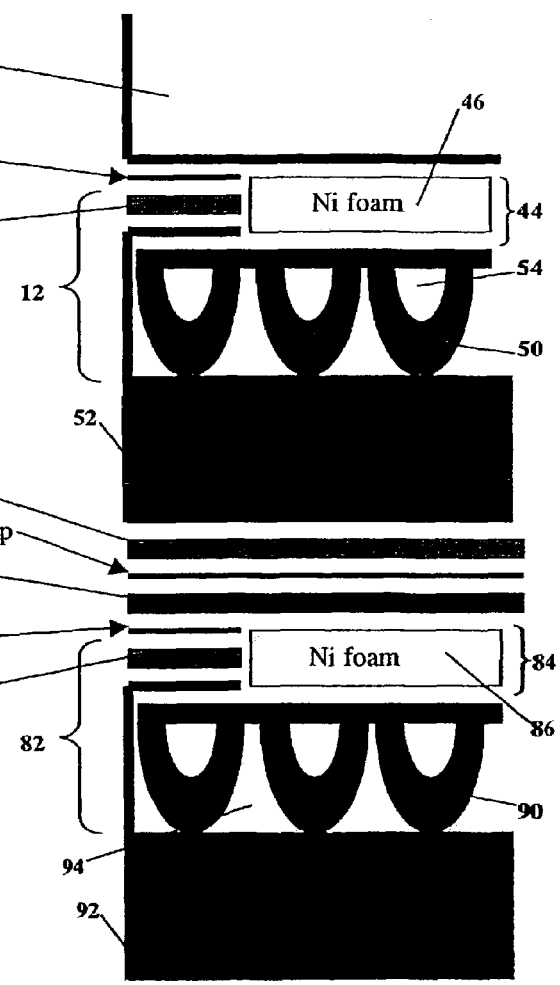
FIG. 4B is a cross-sectional view of the end cell at the positive end of a fuel cell stack along line 4B—4B of FIG. 3.

As shown in FIG. 3 and FIGS. 4A and 4B, the fuel cell stack terminates at both ends with a thick, rigid end plate 14, 24 preferably made of stainless steel. The inactive anode part 12 in positive end cell assembly 10 that separates the positive end plate 14 from ribbed electrode reservoir 16 comprises a foam anode layer 44 (shown in FIG. 4B) and an anode current collector 50.

In the inactive anode part 12, foam anode layer 44 is disposed adjacent to the end plate 14 on the positive end of the stack. Particularly, the foam anode layer 44 comprises a nickel foam inactive anode 46 disposed between two matrix strips 48. The nickel foam anode 46 serves as an electrically conductive separating interface between the end plate 14 and the ribbed electrode reservoir 16. Matrix strips 48 are preferably formed from porous ceramics and are disposed along either side of the nickel foam anode 46 relative to the flow of reducing gas (e.g., hydrogen) and the liquid electrolyte may fill the strips 48. By filling with electrolyte, and blocking the fuel gas from flowing elsewhere, matrix strips 48 help maintain a gas seal between the hydrogen and oxygen gases flowing through the cell stack at the same time.

Disposed immediately beneath the foam anode layer 44 in the inactive anode part 12 is an anode current collector (ACC) 50, preferably made of austenitic stainless steel. The ACC is contained within the top pocket of a bipolar plate 52 having a three-dimensional "S"-shaped configuration. The bipolar plate 52, preferably made of Ni coated austenitic stainless steel, defines top and bottom pockets 54, 56 (shown in FIGS. 4A and 4B) disposed along the flow of reducing gas and along the flow of oxidizing gas, respectively. The top and bottom pockets 54, 56 of the "S"-shaped bipolar plate each form a lip folding over a portion of the top and bottom pockets, along both edges thereof. The top lip of the bipolar plate 52 folds over the ACC 50 along its edges parallel to the direction of the flow of reducing gas and matches up with the edges of the nickel foam anode 46 such that the foam anode is disposed directly above the ACC 50, between the top edges of the bipolar plate 52, as shown. Thus, the ACC 50 is in direct contact with, and collects current from, the nickel foam inactive anode 46. Both matrix strips 48 in the foam anode layer 44 are sandwiched between the top lip of the bipolar plate 52 and the positive end plate 14.

A center portion of the bipolar plate 52 separates the ACC 50 from the structure contained within the bottom pocket 56 of the bipolar plate. The foam anode layer 44 and the anode current collector 50 together make up the inactive anode part 12, which separates the positive end plate 14 from the ribbed electrode reservoir 16, described in further detail below.

The lower lip of the bipolar plate 52 folds under the bottom pocket along its edge, parallel to the direction of the flow of oxidizing gas. However, unlike the top pocket 54 formed by the bipolar plate 52, in which the ACC 50 is completely disposed, the bottom pocket 56 of the bipolar plate 52 contains both a soft, compliant cathode current collector (CCC) 60 and a ribbed cathode 64.

The soft, compliant CCC 60 is preferably made of austenitic stainless steel or superalloy and is disposed between the lower lip and the center portion of the bipolar plate 52 along the length of the lower lip, parallel to the flow of oxidizing gas. The soft CCC is compliant, resilient and capable of returning to its original shape or form after accommodating mechanical changes in the end cell at operating temperatures of the fuel cell stack. In order to maintain contact of the soft CCC 60 with the bipolar plate 52, a metal shim 62 may be disposed between the soft CCC 60 and lower lip along its length. The soft, compliant CCC 60 has a lower yield stress and lower spring constant (approximately 50% less) relative to the active area of the end cell. The compliant and resilient CCC used in the end cell design of the present invention greatly reduces or eliminates contact loss in the end cell by yielding to compressive forces and accommodating mechanical changes in the end cell, particularly with respect to the cathode, due to deep thermal cycling during operation of the fuel cell stack, and by conforming to the required shape after having been compressed.

The combined effect of the soft, compliant CCC 60 in the bottom pocket 56 of the bipolar plate 52 and the electrically conductive separating interface provided by the inactive anode part 12, described above, is to avoid contact loss and the corresponding irreversible increase in electrical resistance within the end cell, particularly with respect to the cathode side of the fuel cell stack, in which mechanical mismatch is typically the greatest.

A ribbed cathode 64 is also disposed in the bottom pocket 56 of the bipolar plate. The ribbed cathode 64 is preferably made of Ni and, as shown in FIG. 3, it has structural peaks and valleys. The ribbed structure of the cathode provides channels for oxidizing gas to flow through and uniformly oxidize the nickel material from which the ribbed cathode 64 is primarily made. The lower lip of the bipolar plate 52, which folds under the soft, compliant CCC strips 60 parallel to the direction of the flow of oxidizing gas, matches up with the edges of ribbed cathode 64 such that the ribbed cathode is disposed between the strips of soft CCC 60 and the lower lip portions of the bipolar plate 52, and directly above a flat cathode layer 68. The peaks of the ribbed cathode 64 are in direct contact with a flat cathode 70, which is preferably made of Ni.

Matrix strips 72 are disposed on each side of the flat cathode 70, below the lower lip portions of the bipolar plate 52, and have a structure similar to that of the matrix strips 48 in the foam anode layer 44, described above. As in the foam anode layer, the matrix strips 72 fill with liquid electrolyte. In the flat cathode layer 68 presently described, however, the matrix strips 72 are disposed parallel to the direction of oxidizing gas flow.

The combination of the ribbed cathode 64 and flat cathode 70 functions as an electrode reservoir 16 at the upper end of the fuel cell stack. As discussed above with respect to various problems inherent in fuel cell stack operation, molten electrolyte material tends to migrate toward the negative, or anode, end of the stack during operation. In the present invention, the ribbed cathode 64 is preferably made of Ni material having approximately 65% porosity. The flat cathode 70 is preferably made of Ni material of up to 70% porosity. The ribbed and flat cathode structure in the end cell of the present invention can hold in reserve a significant amount of electrolyte material, thereby mitigating electrolyte migration and loss from the upper positive, or cathode, end of the stack.

As shown in FIG. 4B, a second inactive anode part 82 (represented generally by 12 in FIG. 2) disposed beneath the ribbed electrode reservoir 16 separates the electrode reservoir 16 from the active cathode part 18. The second inactive anode part 82 in the positive end cell 10 has the same structure as the inactive anode part 12, namely, a foam anode layer 84 including a foam anode 86 sandwiched between matrix strips 88, and an anode current collector (ACC) 90 in the top pocket 94 of a second three dimensional "S"-shaped bipolar plate 92.

In order to isolate the gas flows of, for example, oxygen through the electrode reservoir 16, and hydrogen through the second inactive anode part 82, a 310 stainless steel sheet 76 is disposed between the electrode reservoir 16 and the second inactive anode part 82. The steel sheet 76 may be aluminized at its edges for corrosion protection.

Below the second inactive anode half cell 82, in the bottom pocket 96 of the second "S"-shaped bipolar plate 92, is disposed a cathode current collector (CCC) 98 of austenitic stainless steel material that can have a similar structure as the anode current collectors 50, 90 in the top pockets 54, 94 of bipolar plates 52, 92. The CCC 98 occupies the entire bottom pocket 96 of the bipolar plate 92 and is positioned in the path of oxidizing gas flow, and it has approximately half the compliance or resilience of the soft CCC 60.

Finally, at the bottom end of the positive end cell assembly 10, a flat standard cathode 100 is disposed immediately below the CCC 98, sandwiched between the lower lip portions of the second bipolar plate 92. The flat standard cathode 100 is preferably made of Ni and provides the interface between the positive end cell 10 and the first regular fuel cell in the molten carbonate fuel cell stack.

Negative End Cell Assembly

Figures 5A, 5B:
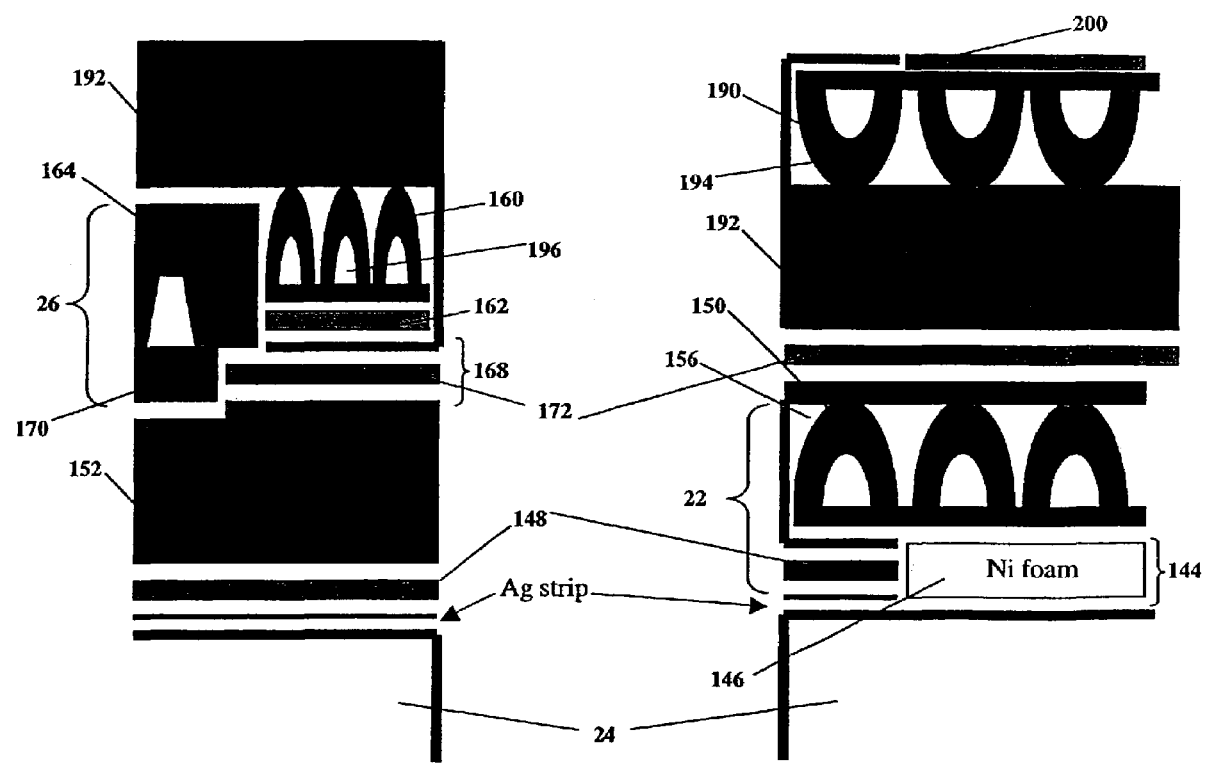
FIG. 5A is a cross-sectional view of the end cell at the negative end of a fuel cell stack along line 5A—5A of FIG. 3.
FIG. 5B is a cross-sectional view of the end cell at the negative end of a fuel cell stack along line 5B—5B of FIG. 3.

The structure of the anode, or negative, end cell 20 is similar to that of the positive end cell 10 described above, but includes only one inactive anode part 22, as will be described in further detail below with respect to the lower portion of FIG. 3 and FIGS. 5A and 5B.

In the negative end cell assembly 20, as generally shown in FIG. 2, an inactive anode part 22 borders the negative end plate 24, separating the end plate from a ribbed electrode sink 26. With reference to the detailed view of the negative end cell assembly 20 shown in the lower portion of FIG. 3 and in FIGS. 5A and 5B, the inactive anode part 22 also comprises a foam anode layer 144 and an anode current collector 150, and in most other respects it is identical to the inactive anode part 12 in the positive end cell assembly 10. In the negative end cell assembly 20, however, the foam anode layer 144 including a nickel foam anode 146 and matrix strips 148 is located immediately adjacent to the negative end plate 24 and is therefore disposed below the ACC 150, not above it as in the positive end cell assembly 10.

The ACC 150 is contained in the pocket 156 of a single-layer bipolar plate 152 having only a lower lip that folds under the ACC 150 along its edges parallel to the direction of the flow of reducing gas. The lower lip meets the edges of the nickel foam anode 146 in the foam anode layer 144 such that the foam anode 146 is disposed directly below the ACC 150, between the lower lip portions of the single-layer bipolar plate 152, as shown. Thus, the ACC 150 is in direct contact with, and collects current from, the nickel foam anode 146. Matrix strips 148 in the foam anode layer 144 are sandwiched between the lower lip portions of the bipolar plate 152 and the negative end plate 24. Strips made of conductive metal such as silver, for example, may be provided between matrix strips 148 and the negative end plate 24, as shown in FIGS. 5A and 5B, to provide corrosion protection to the end plate surfaces. The inactive anode part 22 in the negative end cell assembly 20 thereby provides an electrically conductive separating interface between the negative end plate 24 and a ribbed electrode sink 26, described further below.

The top portion of the single-layer bipolar plate 152 separates the ACC 150 of the inactive anode part 22 from a flat cathode layer 168 in the ribbed electrode sink 26 directly above it. Like the ribbed electrode reservoir 16 in the positive end cell assembly 10, the electrode sink 26 comprises a flat cathode 170 and a ribbed cathode 164.

The flat cathode layer 168 comprises a flat cathode 170 (preferably made of Ni) and two matrix strips 172 disposed on each side of the flat cathode 170, sandwiched between the top portion of the single-layer bipolar plate 152 in the inactive anode part 22, described above, and the lower lip portions of an "S"-shaped bipolar plate 192. The matrix strips 172 in the flat cathode layer 168 are disposed parallel to the direction of oxidizing gas flow such that the matrix strips can seal oxygen gas from the reducing gas.

The "S"-shaped bipolar plate 192 in the negative end cell assembly 20 has the same structure as bipolar plates 52, 92 in the positive end cell assembly 10, in that it defines top and bottom pockets 194, 196 disposed along the flow of reducing gas and along the flow of oxidizing gas, respectively. The top and bottom portions of the "S"-shaped bipolar plate 192 each form a lip folding over a portion of the top and bottom pockets 194, 196, respectively, along both edges thereof. The lower lip of the "S"-shaped bipolar plate 192 folds under the bottom pocket 196 along its edge, parallel to the direction of the flow of oxidizing gas. Like the bottom pocket 56 of the bipolar plate 52 in the electrode reservoir 16 of the positive end cell assembly 10, the bottom pocket 196 of the bipolar plate 192 in the electrode sink 26 contains both a compliant, soft cathode current collector 160 (soft CCC) and a ribbed cathode 164. The soft CCC 160 is disposed in the bottom pocket 196 between the lower lip and the center portion of the bipolar plate 192 along the length of the lower lip, parallel to the flow of oxidizing gas. A ribbed cathode 164 is also disposed in the bottom pocket 196 of the bipolar plate 192. As in the electrode reservoir 16 of the positive end cell assembly 10, the ribbed structure of the cathode 164 provides channels for oxidizing gas to flow through and uniformly oxidize the nickel material from which the ribbed cathode 164 is primarily made. The lower lip of the bipolar plate 192, which folds under the soft, compliant CCC strips 160 parallel to the direction of the flow of oxidizing gas, matches up with the edges of the ribbed cathode 164 such that the ribbed cathode is disposed between the strips of soft CCC 160 and the lower lip portions of the bipolar plate 192. In all other respects, the structure of the ribbed electrode sink 26 in the negative end cell assembly 20 is identical to that of the ribbed electrode reservoir 16 in the positive end cell assembly 10.

The combination of soft, compliant and resilient CCC 160 in the bottom pocket 196 of the bipolar plate 192 and the electrically conductive separating interface provided by the inactive anode part 22 imparts the same advantages in the negative end cell 20 as it does in the positive end cell 10, namely, it avoids contact loss and the corresponding irreversible increase in electrical resistance within the negative end cell assembly. Although more than one inactive anode part 22 may be provided in the negative end cell assembly 20, one inactive anode part 22 as described above is generally sufficient to achieve these advantages, because the active anode of the first cell has a similar structure, from a contact resistance point of view, to the inactive anode and provides a conductive interface between the electrolyte sink and the first cathode half cell at the negative end.

In the negative end cell assembly 20, the combination of the ribbed and flat cathodes 164, 170 provides an electrolyte sink 26 at the lower end of the fuel cell stack. As discussed above with respect to various problems inherent in fuel cell stack operation, molten electrolyte material tends to migrate toward the negative, or anode, end of the stack during operation. The ribbed and flat cathodes 164, 170 are made of the same material as the electrolyte reservoir 16 in the positive end cell assembly 10, having up to 70% porosity. A higher porosity cathode may be used, but would result in greater thickness reduction during operation. However, in the negative end cell design 20, the ribbed and flat cathodes 164, 170 function as a sink or sponge for electrolyte material. The sink 26 absorbs molten electrolyte and holds onto it, thereby preventing the anode end of the stack from flooding or corroding. In combination with the ribbed electrode reservoir 16 in the positive end cell assembly 10, the ribbed electrode sink 26 significantly mitigates electrolyte migration and loss during operation of the molten electrolyte fuel cell stack.

An additional advantage of the present end cell design, in both the positive and negative end cells 10, 20, is that the combination of soft, compliant and resilient CCC with ribbed and flat cathodes provides a softer, more compliant and resilient wet seal in the ribbed electrode reservoir or sink for maintaining electrical contact in the active area of the end cell.

Finally, disposed above the electrode sink 26 in the negative end cell 20, within the top pocket 194 of the three-dimensional "S"-shaped bipolar plate 192, is an anode current collector (ACC) 190. The top lip of the bipolar plate 192 folds over the ACC 190 along its edges parallel to the direction of the flow of reducing gas and matches up with the edges of a standard anode 200 such that the standard anode 200 is disposed directly above the ACC 190, between the top edges of the bipolar plate 192, as shown. Thus, the ACC 190 is in direct contact with, and collects current from, the standard anode 200. The standard anode 200 is preferably made of Ni alloys and provides the interface between the negative end cell 20 and the last regular fuel cell in the molten carbonate fuel cell stack.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A fuel cell assembly comprising:
    a fuel cell stack having a plurality of active fuel cells stacked in an electrical series;
    an end plate at a first end of said stack; and
    an apparatus disposed between said end plate and the active fuel cells of the fuel cell stack, the apparatus comprising:
    an electrolyte storage assembly for storing electrolyte therein; and
    a compliant, electrically conductive assembly adapted to promote electrical contact between said electrolyte storage assembly and said end plate; and
    wherein said electrolyte storage assembly has a first surface adapted to face said end plate and first and second side surfaces extending from said first surface, and said compliant, electrically conductive assembly includes a first part disposed between said first surface and said end plate and second and third parts disposed adjacent the first and second side surfaces, respectively, of said electrolyte storage assembly, and
    wherein: said first part includes: a foam anode abutting said end plate; and an anode current collector abutting said foam anode; and said electrolyte storage assembly comprises: a porous ribbed cathode having one surface forming said first surface of said electrolyte storage assembly, a further surface opposing said one surface, ribs formed in one of said one surface and said further surface of said ribbed cathode, and first and second sides having said first and second side surfaces of said storage assembly, respectively, and connecting said one surface and said further surface of said ribbed cathode; and a porous flat cathode abutting said ribs of said ribbed cathode and forming therewith channels.

2. A fuel cell assembly according to claim 1, wherein said apparatus further comprises plate structure having a central part abutting the one of said one and further surface of said ribbed cathode opposing said ribs and first and second lip areas which extend outward of the lateral ends of said central area and then around and toward each other so as to define first and second cavities adjacent the first and second sides of said ribbed cathode, respectively, and wherein said second and third parts of said compliant, electrically conductive assembly serve as cathode current collectors and are disposed in said first and second cavities, respectively.

3. A fuel cell assembly according to claim 2, wherein said anode current collector and said second and third parts of said compliant, electrically conductive assembly are each formed as a corrugated structure.

4. A fuel cell assembly according to claim 2, wherein said ribbed cathode is made of material having approximately 65% porosity.

5. A fuel cell assembly according to claim 2, wherein said flat cathode is made of material having approximately 70% porosity.

6. A fuel cell assembly according to claim 2, wherein said apparatus further comprises electrolyte stored in said pores of said ribbed and flat cathodes, wherein said ribbed and flat cathodes serve as an electrolyte storage.

7. A fuel cell assembly according to claim 2, wherein said flat cathode is disposed between said anode current collector and said ribbed cathode and said ribbed cathode serves as an electrolyte sink capable of collecting, absorbing and storing electrolyte, and wherein said apparatus further comprises:

a further anode current collector facing one of said one and further surface of said ribbed cathode opposing said ribs and a standard anode disposed adjacent to said further anode current collector;

a first bipolar plate defining a top pocket in which said further anode current collector and standard anode are disposed and a bottom pocket forming said plate structure and in which said ribbed cathode and said second and third parts of said compliant, electrically conductive assembly are disposed; and a second bipolar plate situated between said flat anode and said end plate and defining a pocket facing said end plate in which said anode current collector and foam anode are disposed.

8. A fuel cell assembly according to claim 7, wherein said apparatus is disposed at the negative end of said fuel cell stack and wherein said standard anode is disposed between said further anode current collector in the top pocket of said first bipolar plate and a last fuel cell in the fuel cell stack at said negative end.

9. A fuel cell assembly according to claim 2, wherein said apparatus further comprises:

a bipolar plate defining a top pocket in which said anode current collector is disposed, and a bottom pocket defining said plate structure and in which said ribbed cathode and said second and third parts of said compliant, electrically conductive assembly are disposed;

a further foam anode following said flat cathode and a further anode current collector facing said further foam anode;

a cathode current collector following said further anode current collector and a standard cathode facing said cathode current collector; and a second bipolar plate defining a top pocket in which said further anode current collector is disposed and a bottom pocket in which said cathode current collector is disposed.

10. A fuel cell assembly according to claim 9, wherein said end plate is at the positive end of said fuel cell stack and wherein said standard cathode is adapted to be disposed between said cathode current collector and a first fuel cell in the fuel cell stack at said positive end of the stack.

11. A fuel cell assembly according to claim 10, wherein an oxidizing gas flows through the channels formed between said flat cathode and said ribbed cathode and wherein a reducing gas flows perpendicular to said flow of oxidizing gas through further channels and said apparatus further comprises:

matrix strips disposed along opposite sides of each of said foam anode and further foam anode parallel to the direction of reducing gas flow;

matrix strips disposed along opposite sides of said flat cathode parallel to the direction of oxidizing gas flow; and a metallic sheet separating said flat cathode from said foam anode.

12. A fuel cell assembly according to claim 11, wherein said apparatus further comprises a shim disposed beneath each said second and third parts of said compliant, electrically conductive assembly in the bottom pocket of said bipolar plate.

* * * * *